United States Patent [19]

Miyazawa et al.

[11] Patent Number: 5,899,972
[45] Date of Patent: May 4, 1999

[54] INTERACTIVE VOICE RECOGNITION METHOD AND APPARATUS USING AFFIRMATIVE/NEGATIVE CONTENT DISCRIMINATION

[75] Inventors: Yasunaga Miyazawa; Mitsuhiro Inazumi; Hiroshi Hasegawa; Isao Edatsune, all of Suwa, Japan

[73] Assignee: Seiko Epson Corporation, Tokyo, Japan

[21] Appl. No.: 08/536,550

[22] Filed: Sep. 29, 1995

[30] Foreign Application Priority Data

Jun. 22, 1995 [JP] Japan .................................. 7-156528

[51] Int. Cl.[6] ........................................................ G10L 9/06
[52] U.S. Cl. ............................ 704/249; 704/251; 704/236
[58] Field of Search ........................................ 395/2.79, 2.4, 395/2.44, 2.52, 2.55, 2.64; 704/270, 231, 235, 243, 246, 255, 256, 257, 258, 275, 254, 250, 249, 239, 240, 236

[56] References Cited

U.S. PATENT DOCUMENTS

| | | |
|---|---|---|
| 4,319,085 | 3/1982 | Welch et al. .............................. 395/2.4 |
| 4,336,421 | 6/1982 | Welch et al. ............................. 395/2.62 |
| 5,444,673 | 8/1995 | Mathurin ................................. 395/2.79 |
| 5,481,644 | 1/1996 | Inazumi .................................. 395/2.41 |

FOREIGN PATENT DOCUMENTS

| | | | |
|---|---|---|---|
| 62-253093 | 11/1987 | Japan .............................. A63G 25/00 |
| 6-4097 | 1/1994 | Japan .............................. G10L 9/10 |
| 6-119476 | 4/1994 | Japan .............................. G06G 7/60 |

*Primary Examiner*—Richemond Dorvil
*Attorney, Agent, or Firm*—Michael T. Gabrik

[57] ABSTRACT

A technique for improving voice recognition in low-cost, speech interactive devices. This technique calls for implementing a affirmative/negative discrimination unit in parallel with a word detection unit to permit comprehension of spoken commands or messages issued by binary questions when no recognizable words are found. Preferably, affirmative/negative discrimination will include either spoken vowel analysis or negative language descriptor detection of the perceived message or command. Other facets include keyword identification within the perceived message or command, confidence match level comparison or correlation table compilation in order to increase recognition accuracy of word-based recognition, volume analysis, and inclusion of ambient environment information in generating responses to perceived messages or queries.

23 Claims, 4 Drawing Sheets

INTERACTIVE VOICE RECOGNITION METHOD AND APPARATUS USING AFFIRMATIVE/NEGATIVE CONTENT DISCRIMINATION

CROSS REFERENCE TO RELATED APPLICATIONS

This application is related to copending application Ser. No. 08/536,563, filed on Sep. 29, 1995, Attorney's Docket No. P2282a, entitled "Interactive Voice Recognition Method And Apparatus Employing Speaker Specific Word Recognition", commonly assigned with the present invention. This application is also related to the following copending applications: application Ser. No. 08/078,027, filed Jun. 18, 1993, entitled "Speech Recognition System"; application Ser. No. 08/102859, filed Aug. 6, 1993, entitled "Speech Recognition Apparatus"; and application Ser. No. 08/485, 134, filed Jun. 7, 1995, entitled "Speech Recognition Apparatus Using Neural Network and Learning Method Therefor"; all commonly assigned with the present invention.

BACKGROUND OF THE INVENTION

1. Field of the Invention

This invention relates generally to voice recognition technology and is particularly concerned with portable, intelligent, interactive devices responsive to complex voice commands.

2. Description of the Related Art

An example of conventional portable interactive voice recognition equipment is a voice recognition toy. For example, the voice recognition toy that was disclosed by the Japanese Laid Open Publication S62-253093 contains a plurality of pre-registered commands that are objects of recognition. The equipment compares the voice signals emitted by the children or others who are playing with the toy to pre-registered voice signals. If the two voice signals coincide, the equipment generates a pre-determined electrical signal corresponding to the voice command, and causes the toy to perform specific operations based on the electrical signal.

However, toys such as "stuffed dolls" that carry on conversations and perform operations based on the results of voice recognition using the aforementioned canned matching technique, however, are liable to recognize words and expressions that are different from those uttered by the speaker, leading to inaccurate or inappropriate responses. Such errors may frustrate or confuse the speaker, especially children, leading to disuse once the novelty has worn off.

Further, even when correctly recognizing these words and expressions, these toys are unable to react or respond in a manner appropriate for changing situations or environments. In most cases, their limited hardware and software capabilities only permit simple, one-step query and answer type operations. For example, a toy containing pre-registered expressions such as "good morning" and "good night", will simply mimic the speaker or perform some simple response when the speaker says "good morning". The toy will not query the speaker for further information or otherwise assess its surrounding environment.

Such limitations clash with emerging market trends that toys should perform increasingly sophisticated actions. If a child says "good morning" and the toy merely replies "good morning", the novelty wears off quickly. Therefore, voice recognition interaction technology for toys and similar devices should be enhanced and improved to handle more complex and intuitive dialogue, as well as improve recognition accuracy over the widely-implemented matching techniques discussed above.

One potential solution may be to incorporate into such devices continuous voice recognition/response technology that continuously recognizes voice and responsively performs appropriate and complex actions. This approach is quite successful in addressing several of the limitations presented by canned matching. However, proper implementation of conventional continuous voice techniques require copious amounts of memory, complicated signal manipulation circuitry and processing power currently beyond the means of most commercially available personal computers and digital assistants. Accordingly, continuous voice simply does not provide a practical recognition solution for the ultra-cost sensitive electronic toy, gaming or appliance markets.

SUMMARY OF THE INVENTION

It is, therefore, an object of the present invention to implement an interactive voice recognition method and apparatus that can perform natural-sounding conversations without increasing the number of pre-registered words or canned responses characterized by conventional canned matching type voice recognition. Moreover, it is a further object of the present invention to incorporate recognition accuracy and features approaching continuous voice in a device relatively simple in configuration, low in price and easily manufactured. It is yet a further object of the present invention to provide a highly capable, low-cost interactive voice recognition method and apparatus which can be applied to a wide range of devices such as toys, game machines and ordinary electronic devices.

In accordance with these and related objects, the voice recognition technique of the present invention includes: 1) voice analysis, which generates characteristic voice data by analyzing perceived voice; 2) word detection, which reads the characteristic voice data and outputs detected data corresponding to pre-registered words contained within a word registry; 3) affirmative/negative discrimination, which determines whether the characteristic voice data is either negative or affirmative and labels the data as such; 4) voice comprehension and conversation, which, based off either registered word detection or affirmative/negative discrimination, reads the detected voice data, comprehends its meaning and determines a corresponding response; 5) voice synthesis, which generates a voice synthesis output based on the determined response; and 6) voice output, which externally outputs the synthesized response.

According to the preferred embodiment, affirmative/negative discrimination operates either by: 1) detecting the first occurrence of a vowel component in the characteristic voice data obtained through voice analysis and identifying whether the input voice is of affirmative or negative content according to the type of vowel detected; or 2) detecting particular syllables or sound patterns within the perceived voice message or command indicative of negative or positive responses. Moreover, preferably, word detection operates as the default recognition technique unless and until the voice-operated device requests for affirmative/negative content of the spoken data.

Further, word detection according to the preferred embodiment involves parsing characteristic voice data for registered words. For each detected registered word, the preferred word detector extracts timing information including spoken length and sequence, as well as a confidence factor or match level indicative of correlation strength between perceived data and the matching pre-registered word. In turn, voice comprehension and conversation control uses these confidence levels and timing data, plotted along the time axis, in conjunction with the detected words themselves to glean meaning from the entire perceived voice command or message.

In assessing the meaning of the perceived message or command, the preferred voice comprehension and conversation control unit arranges all perceived registered words in proper temporal sequence. Next, the comprehension and control unit extracts perceived registered words having a confidence factor exceeding a predefined threshold while retaining temporal sequence. If multiple registered words are detected at the same time, each exceeding the minimum confidence threshold, the potential registered word having the highest confidence factor may be selected. Alternatively, the potential recognition candidate may be selected from a predefined correlation table containing confidence levels at which a given registered word appears among a list of other registered words which have been detected.

Once extraction completes, voice comprehension and control according to the preferred embodiment attempts to find the relationship, if any, among the extracted words. If a relationship is found, the preferred comprehension and control unit formulates a suitable response, taking into account prior messages, commands, responses, and even the ambient environment. If, however, no relationship can be found or if presented with too many words, the preferred comprehension and control unit formulates an appropriate error message.

Further, preferably, voice analysis of perceived messages or commands includes perceived volume information. In turn, the comprehension and control unit can respond when perceived volume levels are too low or high. Volume information may also be used to assist in notifying the speaker in the event that the message or command was perceived but is not recognizable. Also, the preferred comprehension and control unit can selectively disable voice analysis and detection during voice transmission activities.

Further, voice comprehension and conversation control according to the preferred embodiment may include a multi-tiered word registry, in order to tie subsequent recognition to the presence/absence of particular keywords in the input voice. Word detection is normally performed using only the top tier of registry, which represents a subset of the total number of pre-registered words. When certain top tier keywords are detected, the preferred embodiment switches into a dedicated recognition mode which performs subsequent recognition using a secondary tier of recognizable words linked to the detected keyword. Each secondary tier normally consists of those words used primarily in conjunction with a specific top tier keyword but are otherwise infrequently encountered, and are recognized only when the special mode is set. Further, word detection according to the preferred embodiment preferably only checks for secondary tier words while in the special mode.

Further still, the preferred voice comprehension and conversation control unit may poll for fluctuating data such as date/time, temperature, pressure and equipment status, and, relative to the message content obtained through word detection or affirmative/negative discrimination, incorporates such information into an appropriate response.

In practice, the interactive voice recognition techniques of the present invention permit a voice-driven toy or similar appliance to selectively use affirmative/negative recognition when it must reply either affirmatively or negatively in response to a speaker's question. The device determines whether the content of the speaker is message is affirmative or negative, and generates a response message for the speaker's response. In this manner, the voice-driven device according to the present invention is able to understand and carry on a conversation using words other than those contained in its registry. This enables the device to carry on natural-sounding and logically progressive conversations with a wide range of variation without needing to increase the size of the word registry. Plus, when recognizing a pre-registered vowel, syllable or sound in otherwise unintelligible phrase, equipment incorporating the techniques of the present invention can still attempt to predict the phrase's meaning and formulate a response based on the prediction, unlike prior art canned matching voice recognizers. Given voice input containing two or more registered words, equipment incorporating the preferred embodiment can understand the meaning of the entire input voice by detecting the registered words that comprise keywords, and can respond to the input. This gives the equipment the ability to carry on natural-sounding conversations with a wide range of variation without requiring an increase in the number of recognizable registered words.

Further, devices according to the present invention can use fluctuation data such as time, temperature, pressure, and date, and even equipment status data, in order to determine response data according to the contents of data received from either through word detection or affirmative/negative discrimination. In this manner, such devices can generate responses according to the various conditions and can carry on conversations with a high degree of complexity and variation, as compared to known systems of similar cost.

Other objects and attainments together with a fuller understanding of the invention will become apparent and appreciated by referring to the following description of the presently preferred embodiment and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENT

As depicted in the figures, the presently preferred embodiment exemplifies voice recognition techniques of the present invention as applied to an inexpensive voice-based toy, gaming device, or similar interactive appliance. Though an ordinary skill in the voice recognition art will recognize that the teachings of the present invention are not so limited, the presently preferred embodiment can be conveniently implemented as a standalone voice recognition device residing within a stuffed doll such as dog, cat or bear suitable for young children.

Figure 1:
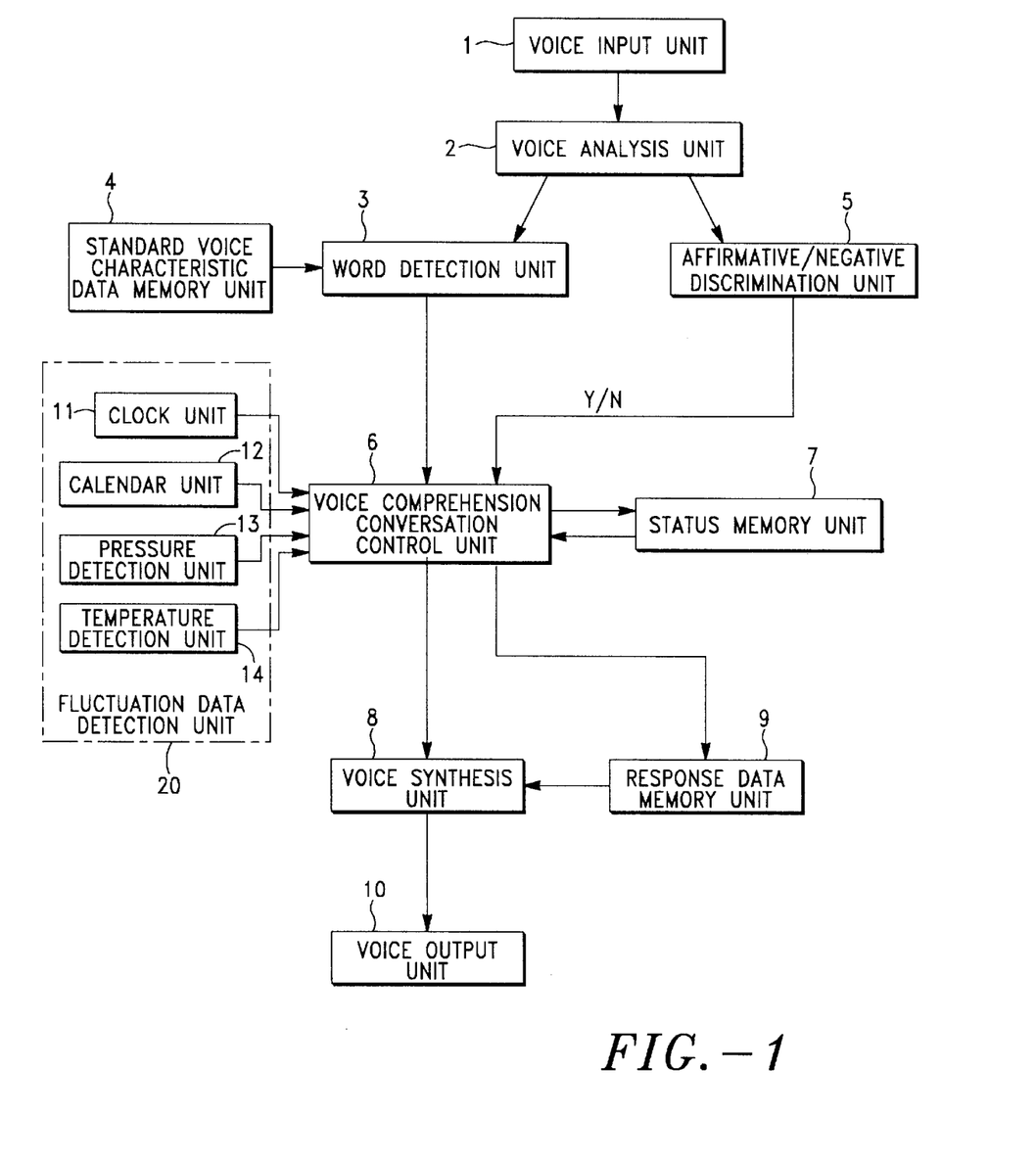
FIG. 1 is an overall block diagram of the preferred embodiment.

FIG. 1 shows a configuration block diagram depicting the preferred embodiment of the present invention. Schematically, this embodiment is composed of voice input unit 1, voice analysis unit 2, word detection unit 3, standard voice characteristic data memory unit 4, affirmative/negative discrimination unit 5, voice comprehension and conversation control unit 6, status memory unit 7, voice synthesis unit 8, response data memory unit 9, voice output unit 10 and fluctuation data detection unit 20. Data detection unit 20 is further broken down into clock unit 11, calendar unit 12, barometric pressure detection unit 13 and temperature detection unit 14. According to the present embodiment, these data detection unit 20 components need not be localized and can be scattered throughout the implemented stuffed doll, toy or device as long as an communicative link is maintained between them and the comprehension and control unit 6.

The voice input unit 1 is composed of the following combination of conventional components(not shown): a microphone, an amplifier, a low-pass filter, an A/D (analog to digital) converter, etc. As is well known in the art, the microphone picks out sounds, including spoken commands and messages, exceeding a threshold decibel level, and converts it into electrical signals. The amplifier and filter strengthen and shape the electrical signal into an analog audio waveform suitable for A/D conversion. The audio waveform is then conventionally converted into digital form (e.g. 12 KHz sampling with 16 bit resolution) by the A/D converter and is output to voice analysis unit 2.

Voice analysis unit 2 takes the digitized audio waveform signals transmitted from voice input unit 1 and uses a processor to perform a frequency analysis at short time intervals for extracting characteristic vectors (commonly LPC-Cepstrum coefficients) of several dimensions that express the characteristic of the frequency as is well known in the art. Next, the voice analysis unit transmits the time series of the characteristic vectors of the digitized audio waveform (hereinafter referred to as "characteristic voice vector series") to word detection unit 3 and affirmative/negative discrimination unit 5.

Though not shown in FIG. 1, word detection unit 3 preferably includes a processor and ROM for storing signal processing and registration detection functions. Its function is to determine if the voice message or command contains any words registered in standard voice characteristic data memory unit 4, and if so, to additionally determine the matching confidence level for all found pre-registered words. These word recognition and confidence level functions will be described in more detail with reference to specific examples discussed hereinbelow. In this embodiment, standard voice characteristic data memory unit 4 stores a predefined registry of standard voice characteristic data corresponding to command, action or query words or phrases which would be commonly encountered by the embodiment, depending on its implementation. Using the stuffed doll example above, phrases such as English language greetings "good morning", "good night", "good afternoon", "tomorrow" and "weather" may be contained within the registry and stored in memory unit 4. Of course, the memory unit 4 should be large enough to include alternative pronunciations as well as accent, inflection, tone, rhythm and related speech patterns idiosyncrasies commonly encountered among individual users, but its physical capacity or configuration is not necessarily limited to any particular size or technology (e.g. semiconductor RAM or ROM, optical disk, magnetic tape, etc.) Also, it should be noted that the particular number of words or phrases contained in the registry of memory unit is not particularly important to the practicing of the current invention. However, as the size of the registry grows to handle additional or more complex transactions requested by the speaker, more memory must be devoted for registry storage, and, on the average, registration recognition takes more clock cycles to process and accuracy (as a function of match confidence) worsens. Conversely, a smaller registry provides relatively better accuracy and is less burdensome on system resources, but at the expense of word comprehension and response capabilities. Therefore, one must carefully choose and limit the registry to balance the competing objectives according to the specific implementation.

The affirmative/negative discrimination unit 5 also preferably includes a software-driven controller or processor (not shown) for handling its assigned tasks. Its primary function is to determine, or at least guess, whether the voice uttered by the speaker constitutes an affirmative expression or negative expression when responding to a binary question (e.g. one requiring a true/false or yes/no reply) issued by the embodiment. More specifically, if the response from the implementing device requires either a "yes" or a "no" response from the speaker, the affirmative/negative discrimination unit determines whether the speaker's response has an affirmative or a negative meaning. In this case, the speaker's response can be a one-word response, such as "Yes"; a clause response such as "That's right, let's go together"; or a sentence response, such as "That's right, let's go together. It should be fun tomorrow . . . ".

According to the preferred embodiment, when the speaker responds to a binary question, affirmative/negative discrimination unit 5 may extract the first occurrence of a vowel component in the characteristic voice vector series representing the response, as constructed by voice analysis unit 2. The affirmative/negative discrimination unit next attempts to determine whether the speaker's response is affirmative or negative according to the type of vowel component that is extracted. If the response is affirmative, the affirmative/negative discrimination unit 5 broadcasts a "Y" signal to the voice comprehension and control unit 6. Likewise, if the response is negative, the affirmative/negative discrimination unit outputs an "N" signal.

For example, the preferred embodiment can be preconfigured to recognize and respond to speaker commands or messages spoken in the Japanese language. In such a case, if the first occurrence of a vowel component in the characteristic audio vector series in response to the speaker's reply is an "a", "u", or "o", the affinnative/negative discrimination unit 5 may conclude that the speaker's reply is affirmative. On the other hand, if the first occurrence of a vowel component is either "i" or "e", the affirmative/negative discrimination unit should conclude that the speaker's replay is negative. To illustrate, if the speaker's reply is "hai", "un", or "soudesu", indicating an affirmation, the first occurrence of a vowel in this case is "a", "u", or "o". On the other hand, if the speaker's reply is negative, such as "iie" or "chigau", the first occurrence of a vowel is "i" in both cases. A review of statistical data indicates that this scheme produces the correct determination in 95% of the cases when Japanese is the chosen recognition language. However, there are exceptions which will be discussed more detail hereinbelow.

Also, the affirmative/negative discrimination unit 5 can be used to predict whether a perceived command or message spoken in English constitutes a negative or a positive response, albeit with a little less accuracy. In this case, the affirmative/negative discriminator scans the entire perceived message or command for the presence of particular syllables or sounds, known as negative language descriptors, indicative of a negative response. These syllables or sounds could include no (as in no), nu (as in nuh), au (as in naughty), ont (as in don't), ant (as in can't, etc.) If these occur anywhere within the speaker's reply, the affirmative/negative discrimination unit 5 should conclude that the speaker's reply is negative. Otherwise, the affirmative/negative discrimination unit should conclude that the speaker's reply is affirmative.

To illustrate the English language application, if the speaker's reply is "no", "Let's not do it", "This cannot be the temperature", and the like, the affirmative/negative discriminator should, in each of these instances, determine that the response is negative. By contrast, if the speaker's reply is, for example, "This is true", "yes", "Let's go to the fair", or any other expression which does not contain of these predefined negative symbols, the response is deemed to be affirmative.

Preferably, vowel recognition within the affirmative/negative discrimination unit is performed by comparing representative vowel characteristic vectors stored within the affirmative/negative discrimination unit with the characteristic voice vector series produced by the voice analysis unit 2. Alternatively, though not specifically shown in FIG. 1, these exemplar or representative vowels used in comparison could easily stored in another convenient memory or storage location, and could even be derived or isolated directly from the characteristic vector series for those pre-registered words contained in data memory unit 4, provided that it is capable of at least read access by the affirmative/negative discrimination unit 5. Then, a characteristic series comparison is made between the earliest occurring qualifying vowel against the aforementioned representative vowels to determine the affirmative/negative character and content of the entire message.

In the case of Japanese language recognition applications, if a Japanese word such as "soudesu" (it is so) is perceived by the embodiment, the beginning characteristic vectors of the characteristic voice vector series corresponding to "soudesu" as generated by the voice analysis unit 2 is compared to the characteristic vectors "a", "e", "i", "o", and "u" maintained within the data memory unit 4 in terms of their sequence and distance from the beginning of the perceived message or command. In this case, the distance to the first temporal occurrence of the characteristic vector "o" has a high probability of being sequenced less than a certain threshold delay from the beginning of the perceived input voice, and so results in the discrimination unit 5 determining that the first vowel that occurs in the word "soudesu" is "o".

In English recognition applications, vector characteristics could again be compared and the results analyzed for matches.

It should be noted here that the word detection unit 3 can be implemented using the hidden Markov model (HMM) method or the DP-matching method, as is well-known in the voice recognition art. However, in the preferred embodiment, keyword-spotting processing technology using the dynamic recurrent neural network (DRNN) method is used as disclosed by Applicants in U.S. application Ser. No. 08/078,027, filed Jun. 18, 1993, entitled "Speech Recognition System", commonly assigned with the present invention to Seiko-Epson Corporation of Tokyo, Japan, which is incorporated fully herein by reference. Also, this method is disclosed in the counterpart laid open Japanese applications H6-4097 and H6-119476. DRNN is preferably used in order to perform voice recognition of virtually continuous speech by non-specific speakers and to output word detection data as described herein.

The specific word recognition and confidence matching tasks handled by word detection unit 3 can be conveniently detailed with reference to FIGS. 2A–2E. Generally speaking, the word detection unit 3 may subdivide the entire characteristic voice vector series corresponding to the perceived clause into appropriately-sized blocks of information. Next, the word detection unit 3 recursively or concurrently compares, dependent on the size of the word registry, the extracted blocks against each registered vector series contained in the word registry, as is well-known in the voice recognition art. If one or more matches are found , each matched word, its temporal position in the characteristic voice vector series, and its match confidence factor or level value is transmitted to the comprehension and conversation control unit 6 for relationship testing and response formation.

Figure 2A:
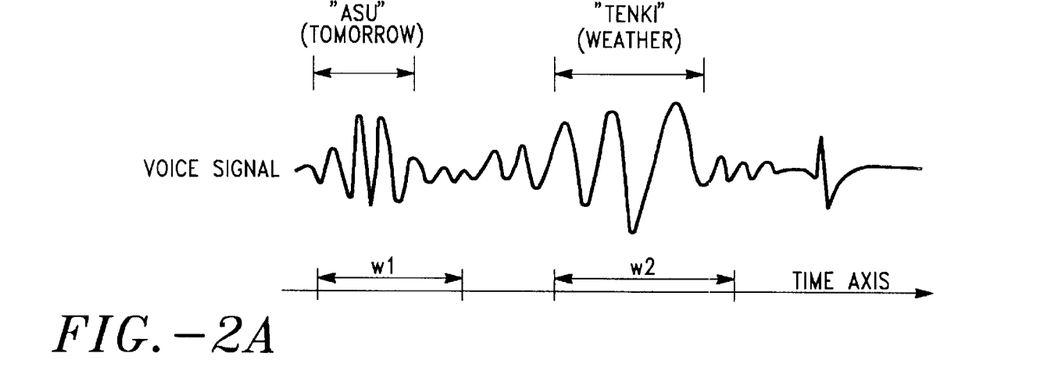
FIGS. 2A–2E diagrammatically illustrate a sample input voice waveform and resultant word lattice generated by the word detection unit of the embodiment shown in FIG. 1.

With specific reference to FIGS. 2A–2E, suppose that, in a Japanese language implementation, the speaker asks the Japanese expression, "asu no tenki wa . . . ", meaning "Concerning tomorrow's weather . . . ". The analog voice waveform, corresponding to this expression as perceived by the embodiment is diagrammatically shown in FIG. 2A. Assuming a total word registry of four words, two of which include "asu"(tomorrow) and "tenki"(weather), the following observations may be made. First, based on relatively small size of the word registry, the word detection unit could easily handle concurrent detection of all pre-registered words, preferably as four independent detection processes preferably executed by the processor of the word detection unit 3. Concurrent detection with respect to the waveform of FIG. 2A is indicated by output FIGS. 2B–2E corresponding to detection processes 1–4 respectively.

Figure 2B:
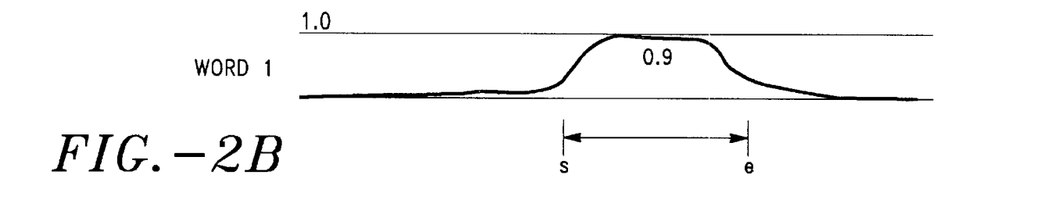
Figure 2C:
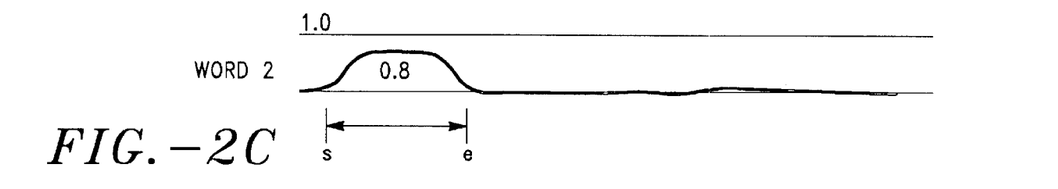

In this example, the first detection process looks solely for the presence of "tenki" within the characteristic voice vector series (not shown) corresponding to the voice waveform shown in FIG. 2A, and outputs match information in a manner described in FIG. 2B. The second detection process looks for "asu" and outputs match information as illustrated in FIG. 2C; the third detection process looks for "nanji" (time) and outputs match information according to FIG. 2D; and the fourth detection process looks for "ohayou" (good morning) and outputs match information according to FIG. 2E.

As shown in FIG. 2B, the first detection process in this example indicates a potential match between the word "tenki" and a portion of the voice waveform during time period w2 by increasing the magnitude of a continuous analog signal beginning at point s and ending at point e. The relative level or magnitude of the signal can fluctuate between ~0 and 1.0, with 0 indicating a nearly zero confidence match factor and 1.0 representing a 100% confidence match factor. FIG. 2B indicates an s-e peak magnitude of approximately 0.9 during time period w2, meaning that a high probability that the target word "tenki" has been spoken at this point in the perceived message or command, and thus be considered as a recognition candidate relative to the input voice waveform. Similarly, if the word "asu" occurs in the voice waveform during time period w1, the detection process that is waiting for the word "asu" has an output which rises at the portion "asu" in the input voice as shown in FIG. 2C.

Figure 2D:
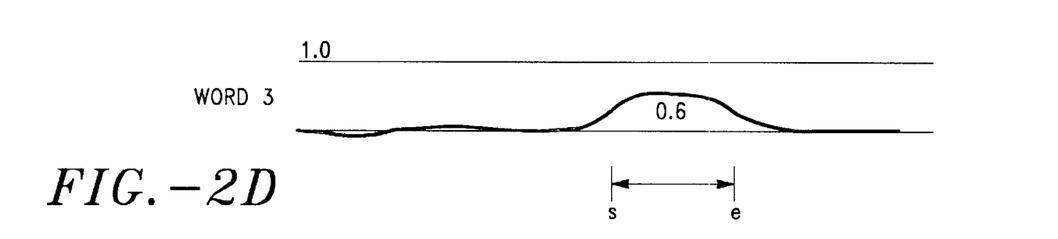
Figure 2E:
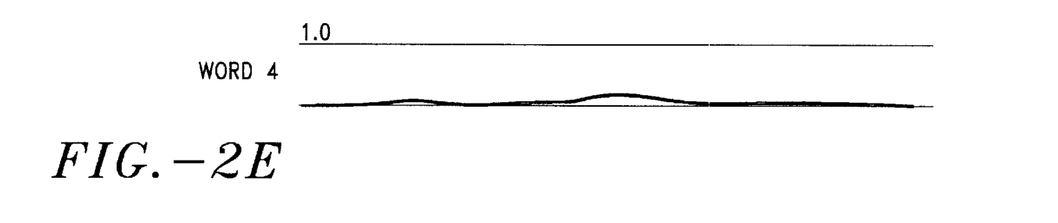

Also, FIG. 2D shows that, when the word "tenki" is input, the detection process that is waiting for word 3 (herein "nanji") has an output that rises at position w2 on the time axis with an uncertain confidence level (approximately 0.6 in numerical value) and is concurrently tagged as a potential recognition candidate. Preferably, if two or more registered words exist as recognition candidates at the same time relative to an input voice waveform, the winning recognition candidate word or phrase is determined by either selecting the word with the highest relative confidence match or by compiling and scrutinizing a correlation table expressing potential candidates when known pre-registered words are input into word detection unit 2. The following describes a specific example of selecting a recognition candidate from a list of potential recognition candidates using such a correlation table. Preferably, this processing is carried out by the voice comprehension and conversation control unit 6 in conjunction with the word detection unit 3 and data memory 4, when multiple pre-registered words have been potentially recognized by the word detection unit 3, but before contextual relationship testing begins.

Figure 3A:
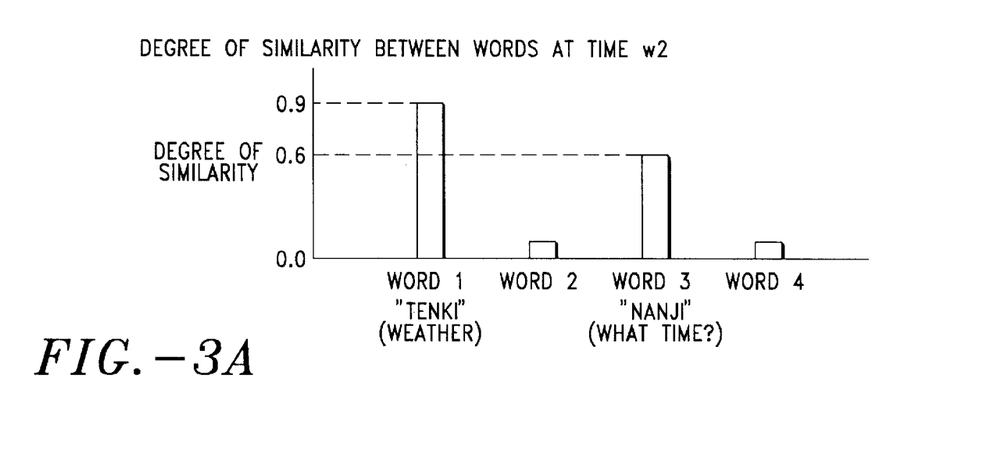
FIGS. 3A–3C diagrammatically illustrate a sample word correlation table referenced by the voice comprehension and conversation control unit according to the embodiment shown in FIG. 1.
Figure 3B:
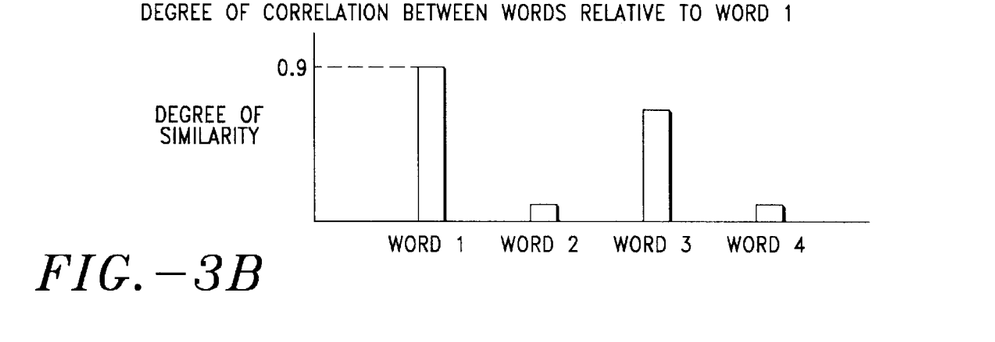
Figure 3C:
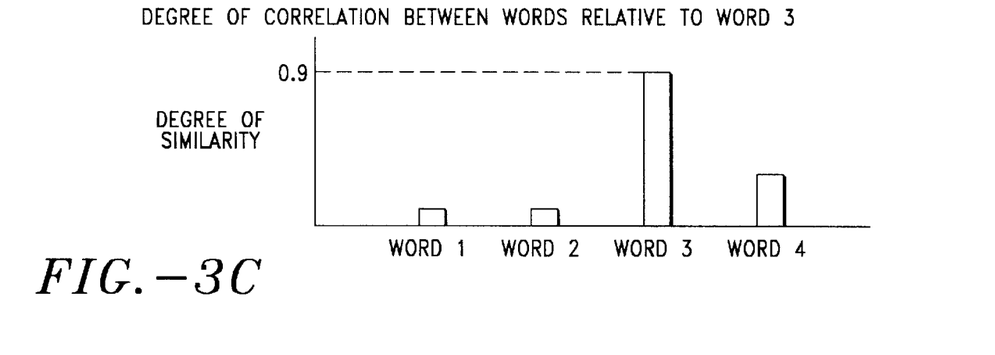
Figure 4A:
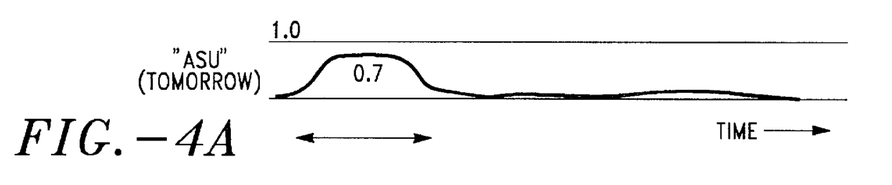
FIGS. 4A and 4B illustrate sample word detection data constructed by the word detection unit according to the embodiment shown in FIG. 1.
Figure 4B:
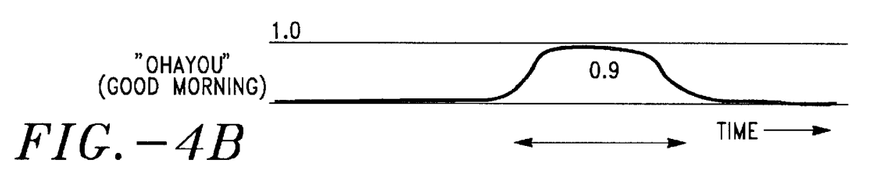

The correlation table expresses, for each registered word, the degree of its similarity to other registered words which have been potentially recognized in the input voice waveform, as shown in FIGS. 3A–3C. For the sake of explaining this example with reference to the previously described FIG. 2, the example uses the same four pre-registered words, wherein "tenki" is word 1, "asu" is word 2, "nanji" is word 3, and "ohayou" is word 4 and the waveform shown in FIG. 2A is assumed as the input voice. FIG. 3A shows the confidence match levels output by word detection unit 3 at position w2 on the time axis in FIG. 2A. Word 1 has a high match level of 0.9, indicating a high degree of similarity between it and the word actually spoken in the perceived command or message. Similarly, word 3 has a relatively confident match level of 0.6. Notice that words 2 and 4, on the other hand, have extremely low match levels and are thus not considered as potential recognition candidates.

FIG. 3B shows a correlation between the perceived registered words or keywords relative to registered word 1. When word 1 characteristic voice vector data is actually substituted for the perceived voice during time w2 of the input waveform, the confidence match levels generated by the word detection unit 3 during w2 appear as shown in FIG. 3B. The degree of similarity of word 1 is high at 0.9, as it should because identical voice vector characteristics are being compared. The next highest value is found in word 3. This is because word 3 evidently shares common or comparatively similar characteristic voice vectors with word 1. By contrast, words 2 and 4 have extremely low confidence match levels, and are not considered as potential recognition candidates. Therefore, when word 1 is substituted in the input waveform, the potential candidates, along with their respective confidence levels, closely mimic the results obtained when the input waveform is processed by the word detection unit 3 in unaltered form. The potential recognition candidates relative to word 1, i.e. words 1 and 3, are then preferably stored in status memory unit 7.

Conversely, FIG. 3C shows the correlation between perceived keywords relative to word 3. According to this figure, when word 3 is substituted in the input waveform at time w2 as indicated in FIG. 2A, the degree of similarity to word 3 from word detection unit 3 has a high value of 0.9 as expected but the degrees of similarity for words 1, 2, and 4 are extremely low. Therefore, unlike in the cases of the original waveform or word 1 substitution, only word 3 is identified as a potential recognition candidate with respect to word 3, and is preferably stored as such in status memory unit 7.

Thus, comparing the word detection unit 3 word lattice data shown in FIG. 3A to the correlation table stored in status memory unit 7 as mentioned above, voice comprehension conversation control unit 6 determines that the recognition word is word 1. If word 1 is substituted, words 1 and 3 are possible recognition candidates as is indicated when the word detection unit 3 operates on the original input waveform. But, if word 3 is substituted, word 1 is excluded and results in a correlation table entry different from that implicated by the original waveform.

Although FIGS. 3A–3C only show a correlation table for words 1 and 3, in actuality correlation tables between all registered words are provided. These correlation tables are stored in status memory unit 7. Moreover, the contents of these correlation tables are rewritable. Each speaker has his own idiosyncrasies, so that whenever a person enunciates one word, he is likely to use other words with a great degree of similarity. To accommodate these type of individual characteristics, the contents of correlation tables are designed to be regrettable and adaptable based on past use.

Moreover, unlike affirmative/negative discrimination as discussed hereinabove, word correlation can be applied with similar effectiveness to other languages without modification, in addition to the Japanese-based example shown in FIGS. 2A–2E and FIGS. 3A–3C. This holds true as long as the word registry held within data memory 4 contains an appropriate and suitably extensive vocabulary for the chosen language and application. For example, the English words weather, tomorrow, brother and time could be stored as words 1 through 4 respectively in the word registry of data memory unit 4. When the question "What will the weather be like tomorrow?" is perceived by the preferred embodiment, a correlation table can be built if the word detection unit 3 detects simultaneous detection of both the word "weather" and "brother" in order to determine which word was in fact spoken. Alternatively, of course, the preferred embodiment could rely on differing confidence levels in order to make this determination, as discussed hereinabove.

Turning back to FIG. 1, in the preferred embodiment, voice comprehension and conversation control unit 6 is principally composed of at least one dedicated processor and ROM that stores the processing program and performs the processing tasks described hereinbelow.

Preferably, the voice comprehension and conversation control unit 6 is responsible for: 1)selecting either a recognition word output from word detection unit 3 or an affirmative/negative output (Y or N) from the affirmative/negative discrimination unit 5; 2) setting the conversation mode for the next command or message; 3)understanding the meaning of the input voice based on the fluctuation data obtained from fluctuation data detection unit 20, composed of clock unit 11, calendar unit 12, pressure detection unit 13, and temperature detection unit 14, as well as from context rules contained in status memory unit 7, as will be discussed in detail hereinbelow; 4) determining the response to be generated according to the identified meaning, the environment, and time; and 5) transmitting output signals to voice synthesis unit 8 and response data memory unit 9. For example, when the detected data shown in FIGS. 2A–2E is received from word detection unit 3 (this data is referred to as a word lattice, which includes signals such as a registered word name, confidence match level, and signals that indicate the starting point s and the ending point e for the word), the voice comprehension conversation control unit determines one or more word as a keyword occurring in the input voice, based on the word lattice. In this example, since the input voice is "asu no tenki wa", the words "asu" and "tenki" are detected as keywords contained in the input voice. From the keywords "asu" and "tenki", the voice comprehension and conversation control unit, with help from the context rules contained in status memory 7, will be able to understand the contents of the continuous input voice "asu no tenki wa".

The voice recognition processing of virtually continuous voice by keyword spotting, as described hereinabove, is equally applicable to other languages besides Japanese. If the language to be used is English, for instance, some of the recognizable words that can be registered might be "good morning", "time", "tomorrow", and "good night". The characteristic data for each of these registered words is stored in the word registry within standard voice characteristic data memory unit 4. If a speaker asks "What time is it now?", the word "time" in the clause "what time is it now" is used as a keyword. When the word "time" occurs in the input voice, the detection signal that is waiting for the word "time" rises at the portion "time" in the input voice. When detected data (a word lattice) from word detection unit 3 is input, one or more words in the input voice is determined as a keyword. Since in this example the input voice is "what time is it now", "time" is detected as a keyword, and the voice comprehension and conversation control unit understands the contents of the continuous input voice "what time is it now?"

Further, whenever there is a change in data, such as fluctuation data or the contents of status memory unit 7, voice comprehension and conversation control unit 6 writes the changed information into status memory unit 7 as necessary. The synthesized digital signals that are audio-synthesized in the voice synthesis unit 8 are transmitted to voice output unit 10 composed of a D/A converter, an amplifier, and speakers connected in a known fashion; and are broadcast as an audible response message. Along with the word lattice, signals indicating the volume of an input voice) from voice analysis unit 2 are input into voice comprehension and conversation control unit 6 through word detection unit 3. Furthermore, voice comprehension conversation control unit 6 prohibits the input of voice from speakers when the preferred embodiment is producing a voice.

In terms of mode-setting, in its initial state, the voice comprehension and conversation control unit 6 is automatically set to the word recognition mode. In this case, signals from word detection unit 3 are enabled and those from affirmative/negative discrimination unit 5 are disabled. By contrast, if a speaker replies (indicating either "yes" or "no") to a response message (requesting a "yes" or "no" response) from a device (a stuffed doll in this case), the affirmative/negative discrimination mode sets in. In this case, affirmative/negative discrimination unit 7 is enabled, and word detection unit 3 is disabled.

These modes are determined preferably according to the contents of a response message issued by the preferred embodiment. In other words, the affirmative/negative discrimination mode is asserted only when the preferred embodiment requires an affirmative or negative response from the speaker. Even when the affirmative/negative discrimination mode is on, if no input is received from the speaker for longer than a specified time, the mode automatically reverts to the word detection mode.

As noted in the above Japanese language example, affirmative/negative discrimination unit 7 determines that the speaker's reply is in the affirmative if the first occurrence of a vowel is "a", "u", or "o"; and that it is negative if the first occurrence of a vowel is "i" or "e". There are exceptions, however. For example, in the case of the expression "iiiyo"(It will do), the first vowel that is extracted is an "i". This is, however, an affirmative statement and violates the above-defined leading vowel characterizations. Similarly, although the first occurrence of a vowel in "dameyo" (It won't do) is an "a", the expression is, of course, a negative statement. To deal with these exception words, the voice comprehension and conversation control unit 6 performs the following types of processing when attempting to recognize Japanese commands or messages.

With regard to the affirmative/negative indicator words containing exception vowels ("iiyo" or "dameyo" in this case), the voice comprehension and conversation control unit continues to monitor for the input of these exception words even after the affirmative/negative discrimination mode is selected. Thus, if the word "iiyo" or "dameyo" is input from the speaker and signals corresponding to these words rise, the "iiyo" identified in the word detection mode takes precedence. In other words, although affirmative/negative discrimination unit 5 identifies "iiyo" as a negative word and outputs the negation signal "N", in this particular case the voice comprehension conversation control unit performs a processing that gives priority to the "iiyo" in the word detection mode. Similarly, although affirmative/negative discrimination unit 5 identifies "dameyo" as an affirmative word and outputs the affirmation signal "Y", in this particular case the voice comprehension conversation control unit performs a processing that gives priority to the "dame" in the word detection mode.

Referring now back to FIG. 1, the status memory unit 7 is principally composed of RAM. It stores information such as the current conversation mode (the word recognition mode vs. the affirmative/negative discrimination mode); correlation tables for each word as noted above; fluctuation data such as clock unit 11, calendar unit 12, pressure detection unit 13, and temperature detection unit 14 (e.g., the pressure that was measured a few hours ago, the temperatures measured at specific times over the past few days, the clock times at which expressions "good morning", "see you again", "how are you", or "good night" were directed at the stuffed doll example, or the times for which the alarm was set); maximum (or minimum) allowable volume; and the maximum number of words that can be input simultaneously indicating the maximum number of registered words that can occur in a single question clause (sentence). These items can be modified as necessary.

The following describes the present invention using specific conversations that could take place between a speaker and example Japanese and English implementations incorporating the preferred embodiment. In the following examples, the word recognition mode is denoted as "WORDmode", and the affirmative/negative mode as "YNmode". In the speaker's expressions, the word enclosed in square brackets is a keyword for character recognition purposes.

The WORDmode is on in the initial state. When the speaker says in Japanese "[ohayou] gozaimasu" or English "Good [morning] to you", the preferred embodiment replies, "ohayou, kesawa hayaine, atatakaishi, ohanami ni yukouyo", or in English "Good morning. You are starting the day early today. Its nice and warm today. How about going out to enjoy the spring flowers?" as the case may be.

In the Japanese conversation, "ohayou" (good morning) is a keyword, which is pre-registered as a registered word. When the expression "ohayou gozaimasu" (good morning

[polite form]) is input, word detection unit 3 outputs a word lattice for each potential recognition candidate (the name of a potential recognition candidate, its associated confidence match level, and its starting point s and the ending point e along the time axis signifying when the potential recognition candidate is being detected) in response to the input "ohayougozaimasu" similar to that indicated in FIGS. 2A–2E. The word lattices are sent to voice comprehension and conversation control unit 6.

Based on the word lattices received in the Japanese conversation, the voice comprehension and conversation control unit 6 determines the actual registered words occurring in the input voice, using the above-described word detection process. In this case, assume that the potential recognition candidate "ohayou" has a confidence match level of 0.9 while another potential recognition candidate "oyasumi" (good night) has a confidence match level of 0.6 and is registered as occurring at the same time as "ohayou". Other words contained in the spoken command or message do not exceed the minimum threshold confidence match levels, and are accordingly disregarded by the voice comprehension and conversation control unit 6.

Since two potential recognition candidates have been detected simultaneously by the word detection unit 3 in the Japanese conversation example, the voice comprehension and conversation control unit 6 goes on to determine which potential recognition candidate more accurately reflects what was spoken by the user. In doing so, the comprehension and control unit 6 weighs relative confidence matching levels of the potential recognition candidates or, alternatively, builds and tests the input waveform using the correlation table technique discussed hereinabove. In this case, using either technique, the word "ohayou" is recognized the actual word being spoken, and is, in fact, the sole keyword in the example passage.

Once "ohayou" has been recognized from the speaker's voice, the voice comprehension and conversation control unit of the preferred embodiment determines an appropriate Japanese-based response. This is preferably done by combining ambient information obtained through polling the fluctuation data detection unit and combining it with preset or canned response language contained in status memory 7. More specifically, the comprehension and control unit 6 obtains time information from the clock unit 11, and calendar unit 12 as well as temperature and pressure information from the temperature detection unit 14 and pressure detection unit 13 respectively, and pieces together an appropriate response based on context rules and variable insertion points within the canned response. Thus, in this example, the preferred embodiment may generate a response incorporating "ohayou, kesawa hayaine" (Good morning, it must be an early start today.) from the time information, "atatakaishi" (The air is warm today) from the temperature information, and "ohayanimi yukouyo" (How about going out to enjoy the spring flowers?) from the calendar information.

Since the response contents require either an affirmative or a negative response from the speaker, the conversation mode is switched by the comprehension and conversation control unit 6 to the YNmode.

If the speaker replies "Un yukouyo" (Yes, let's go) in response to the question "Ohanami ni yukouyo", because the first occurrence of vowel in the "un yukouyo" characteristic voice vector column in this case is "u" and affirmative/negative discrimination unit 5 determines that the speaker's reply is in the affirmative. Accordingly, it sends the affirmative signal "Y" to voice comprehension conversation control unit 6. This enables voice comprehension and conversation control unit 6 to determine the response to this input, thus generating, for example, the response "Why" from the preferred embodiment. Because the response "Why" requires neither an affirmative nor a negative response, the conversation mode now switches back to the WORDmode. In this manner, a conversation is carried on between the speaker and the preferred embodiment.

If the speaker says "Ittekimasu" (See you later) in the WORDmode, the stuffed doll can carry on a conversation such as "Itterasshai. Kyowa amega furisoudakedo kasa motta?" (Have a good day. Looks like it will rain today. Are you taking an umbrella with you?) This is obtained from the pressure information stored in the status memory, wherein a low barometric pressure indicates the likelihood of precipitation).

If a response requiring an affirmative/negative statement is generated by the preferred embodiment, the conversation mode switches to the YNmode. However, according to the preferred embodiment, if the speaker does not reply within a specified amount of time to a question asked by the stuffed doll, a time-out ensues, and the conversation mode reverts automatically back to the WORDmode.

Turning for a moment to English language-based word recognition, the preferred embodiment will operate similarly as for Japanese word recognition, except that affirmative/negative discrimination will focus on the presence of negative language descriptors in the spoken message rather than on certain vowels at the beginning of the message, as described above. Thus, when the speaker says "Good [morning] to you", word detection is performed to extract the keyword "morning" and the preferred embodiment chooses an appropriate response combination derived from prestored words and fluctuation data. In this particular instance, the preferred embodiment may respond with "Good morning. You are starting the day early today. Its nice and warm today. How about going out to enjoy the spring flowers?" This response, of course, requires an affirmative or negative response from the speaker and so YNmode is enabled. The next command or message voiced by the speaker is scanned for negative language descriptors, and, if present, the response is deemed negative, as discussed hereinabove (otherwise, it is assumed positive). As in the Japanese language example, the preferred embodiment will respond in kind to the characterized affirmative or negative statement.

Suppose now that the speaker asks, "[Asu] no [tenki] wa doukana" or "What will the [weather] be like [tomorrow]?". In this case, there are two registered keywords for each: asu/tomorrow and tenki/weather (Japanese/English). Because of this fact, the word lattice described in FIGS. 2A–2E is transmitted to voice comprehension conversation control unit 6 for the Japanese. This enables voice comprehension conversation control unit 6 to determine the two words, asu/tomorrow and tenki/weather, as recognition words. From these words, the voice comprehension conversation control unit can understand that the speaker's question is "What will the weather be like tomorrow?". Based on this understanding, the voice comprehension and conversation control unit 6 references the pressure fluctuation data (for example, hour-by-hour pressure values stored in status memory unit 7), forecasts tomorrow's weather, and generates a response such as "Asuwa ii tenki ni naruyo"/"It will be fine tomorrow".

As noted above, status memory unit 7 contains a variety of fluctuation data, such as periodic barometric pressure and temperature measurements, the times at which the expressions ohayou/good morning, itte kimasu/see you later, tadaima/hello, I'm back, or oyasumi/good night were spoken to the preferred embodiment, and the times for which the alarm was set in the past. Thus, for example, if the speaker says, "[Oyasumi]"/"Good night", the embodiment may respond "Oyasumi nasai. Kyouwa osoine"/"Good night. It's so late tonight". The phrase Kyouwa osoine/It's so late tonight was obtained by sampling the prior time data associated with the past few occurrences that the keyword "Oyasumi" was spoken. Also, the stuffed doll of the preferred embodiment may add the question "Asuwa oyasumi nano"/"Are you off from work tomorrow?" (inferring that the speaker does not have to go to work tomorrow because the speaker is so late in saying good night to the doll). Because this requires a yes/no response from the speaker, the conversation mode of the preferred embodiment switches to the YNmode. In turn, the speaker may respond with "Iya chigauyo"/Oh no, that is not the case, and since "I" is detecting as the leading vowel and the unit has been programmed for Japanese recognition, the negation signal N is generated by the affirmative/negative discrimination unit 5.

In response, the stuffed doll of the preferred embodiment could reply "Ja asumo itsumonoyouni shichiji ni okosu"/"Do you want me to wake you up at seven o'clock tomorrow, as always ?" (by referencing the past alarm-setting times). The mode remains in YNmode. When the speaker replies, "Un tanomune"/"Yes, please" the affirmation signal Y is generated by the affirmative/negative discrimination unit, and the preferred embodiment may respond, "Wakatta. Oyasuminasai"/"I got it. Good night".

In the above conversations, the stuffed doll's responses in reply to the speaker's expressions are scripted and canned according to what will be said by the speaker. For example, in a conversation that begins with Oyasumi/Good night, if the conversation mode is the YNmode, whether the speaker's reply in response to the question ". . . shichiji ni okosu"/". . . shall I wake you up at seven o'clock" is affirmative or negative is determined, and an appropriate response is output by fetching it from pre-stored information, preferably contained in status memory unit 7.

Figure 5A:
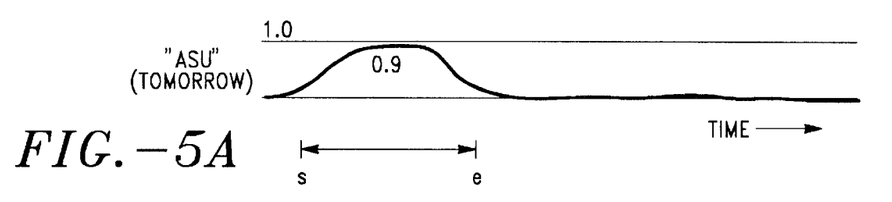
FIGS. 5A–5C illustrate a further example of word detection data constructed by the word detection unit according to the embodiment shown in FIG. 1.
Figure 5B:
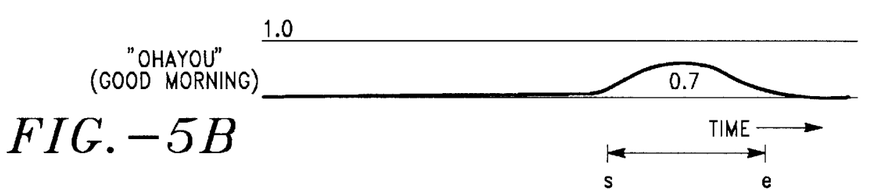
Figure 5C:
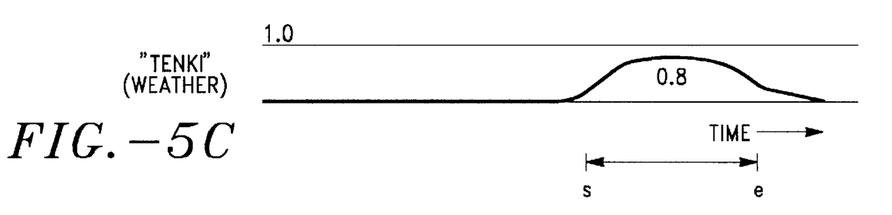

As the foregoing indicates, if two or more words occur on the same time axis at slightly different times with high confidence match levels, and they have related meanings, such as asu/tomorrow and tenki/weather, as noted above, the words can be understood to mean asu no tenki wa/Concerning tomorrow's weather . . . according to well-known combinational and precedence rules prestored in the status memory unit 7 , and a corresponding response can be generated. However, if expressions asu/tomorrow and ohayou/Good morning occur on the same time axis at slightly different times and can be considered plausible recognition candidates, the word with the lower confidence match level is rejected as an erroneous recognition, since the expression asu . . . ohayou/tomorrow . . . good morning would not conform to the prestored context rules, and indeed make little grammatical sense, in either Japanese or English. To illustrate, If the confidence match level for asu/tomorrow is 0.7 and that for ohayou/good morning is 0.9, the word asu/tomorrow is rejected as being an erroneous recognition. Further, as shown in FIGS. 5A–5C, if, on the same time axis, the word asu/tomorrow is detected with a high confidence match level of 0.9 during a first time period, and subsequently ohayou/good morning and tenki/weather are detected with relatively high match levels (0.7 and 0.8) respectively, a determination is made by the preferred voice comprehension and conversation control unit 6 using context rules hinging on the relationship between recognized words. In this case, the word asu/tomorrow is determined as a recognized keyword. Then, by selecting the word tenki/weather as a potential recognition candidate which logically follows asu/tomorrow, in the final analysis the recognized words are determined as asu/tomorrow and tenki/weather. Although in some cases such a determination can be augmented by the correlation table techniques described hereinabove, it should become obvious to an ordinary skill in the voice recognition arts that application of simple context rules to discriminate a proper meaning from input voice waveforms having plural keywords is usually successful without further processing. Further, if otherwise unrelated keywords appear as recognition candidates, the preferred embodiment should at least be able to modify the sequence in which the keywords appear in order to glean meaning from them. If, however, keyword rearrangement proves futile, the stuffed doll according to the preferred embodiment can generate the response "Something is wrong here" to call the problem to the speaker's attention.

As explained above, even if the number of recognizable registered words is limited to 10, the present invention permits the generation of wide-ranging conversations and responses above and beyond the conventional limits associated with the word registry. In conventional systems, if the registered words or expressions include ohayou/good morning, oyasumi/good night, and konnichiwa/good afternoon, the speaker was required to speak the exact same words, and the device only returned those responses that were associated with those words. By contrast, the present invention is capable of recognizing the phrase ohayou/good morning even when the word is nested among other sounds, such as "ohayou", "ooi ohayou"/Yes, good morning, or "ohayou gozaimasu"/Good morning to you by using the above-described keyword discrimination. The provision of affirmative/negative discrimination unit 5 allows the system to generate an appropriate message by determining whether the speaker's reply is in the affirmative or negative by switching the conversation mode to the YNmode to determine if the response by the stuffed doll of the preferred embodiment to the speaker's question requires a YES or NO answer from the speaker. This permits conversations using words other than the registered words and provides a wide latitude in carrying on natural-sounding conversations without requiring an increase in the number of recognizable registered words.

Beyond the processing described above, voice comprehension and conversation control unit 6 can perform a variety of processing tasks using the various pieces of information stored in status memory unit 7. For example, weighting coefficients, established by fluctuation data such as time and temperature, for various words can be stored in status memory unit 7 to establish a history of recognizable word usage. By determining recognition candidate words using these weighting coefficients, it is possible to increase the rate of recognition. The weighting coefficient that is established on said given word would function as follows: For a morning conversation, a high value is assigned to the phrase ohayou/good morning and a low value is assigned to the word oyasumi/good night. In this way, if both the expressions ohayou/good morning and oyasumi/good night are output as recognition candidates having high confidence match levels in response to an input voice containing ohayou/good morning, and by obtaining a composite confidence match level for these potential recognition candidates that takes into account their associated weighting coefficients, the difference between the confidence match levels can be increased, and in this manner the rate of recognition can be improved.

In a concrete example, the weighting coefficient for the phrase ohayou/good morning at 7:00 a.m. might be set to 1.0 and that for the word oyasumi/good night to 0.5. Thus, if the confidence match level for the expression ohayou/good morning in response to an input voice ohayou/good morning is 0.9 and the confidence match level oyasumi/good night is 0.6, one obtains, by multiplying the weighting coefficients, a weighted confidence match level of 0.9 for ohayou/good morning and a degree of similarity of 0.3 for the expression oyasumi/good night. The threefold difference between the two words leads to an accurate recognition in favor of the expression ohayou/good morning. Beyond time data, weighting coefficients can be assigned to words such as samui/cold and atsui/hot depending on the temperature according to temperature data. By considering the weighting coefficients according to the temperature at the time of the conversation, recognition processing on the words samui/cold and atsui/hot can be performed, thus similarly improving the rate of recognition. By assigning weighting coefficients using various fluctuation data, words can be processed in a like manner.

In another facet of the preferred embodiment, voice comprehension conversation control unit 6 receives power signals indicative of the volume level of input voice from voice analysis unit 2 as generated in a known manner. The voice comprehension conversation control unit detects the size of a power signal by comparing it to a pre-assigned threshold value. If the size is greater than a certain power level, the likelihood of an erroneous recognition increases. To avoid this possibility, the stuffed doll implementing the preferred embodiment can generate a response indicating "Please speak more softly". Conversely, if the input voice is less than a certain power level, the likelihood of an erroneous recognition increases. To avoid this possibility, the stuffed doll can generate a message indicating "Please speak louder". These measures enable the speaker to speak with more volume thus improving the rate of recognition.

Word recognition may fail even when the input voice is generated at an appropriate power level. Specifically, if the speaker says something (in registered words), the equipment may fail to recognize the words. In such a case, the stuffed doll according to the preferred embodiment can respond by saying naani?/what?, thus creating the impression of a conversation with a living object.

To save memory space, the maximum number of distinct keywords detectable within a single perceived command or message can be limited to two. This means that rather only simple combination and permutation rules of the word contained in the word registry, along with their associated canned responses, need be placed in status memory 7. Moreover, it allows for quicker comprehension, even when cheaper, less powerful processors are employed in the word detection or comprehension and control units.

However, by distilling or simplifying the context rules or responses, there is a consequent reduction in the embodiment's ability to recognize complicated instructions. If three or more such words occur, the stuffed doll according to the preferred embodiment will respond with the error message "Something is wrong". Thus, if actual keywords detected by an input voice generated by one question include asu/tomorrow, tenki/weather, "nanji"/what time?, and ohayou/good morning, the embodiment will presume misrecognition has occurred. But, often these words do not relate to each other as a whole, and so placing such finite recognition limits does not impact overall utility of the invention. Therefore, while not necessarily preferred, a two keyword per input voice limit is a reasonable tradeoff, especially where manufacturing and parts costs are a key issue.

In yet another facet of the preferred embodiment, a special mode can be set that will function as follows: if registered recognition words contain infrequently-used words (specific words) that are not used frequently but are used in conjunction with words that have specific contents, and if the speaker enters a word that has specific contents, the special mode only recognizes that specific word. For example, suppose that the words "earlier" and "later" are used only in connection with setting a wake-up alarm. In most situations, these words are only used when the speaker asks the stuffed doll of the preferred embodiment, "Wake me up in the morning", the stuffed doll responds, "At seven o'clock as usual?", and the speaker says either "a little [earlier]" or "a little [later]". Therefore, it is not always necessary to always treat the words "earlier" and "later" as standard recognition words located in the first tier of the word registry. Rather, only when the keyword "okoshite" or wake me up is detected is the recognition mode shifted to the special mode that can recognize "earlier" and "later". Thus, by setting a special mode it is possible to allow the system to recognize only specific words in specific instances (i.e. secondary tier words contained in the word registry). In this manner, the overall rate of recognition can be increased. The specific words are by no means limited to "earlier" and "later"; any words can be used that are not frequently used under normal circumstances but are used in conjunction with other words. As an example of shifting from the special mode to the normal mode, the mode could be changed from the special mode to the normal one when the stuffed doll of the preferred embodiment replies "At seven o'clock, as usual?", and the affirmative signal Y is detected indicating that the speaker has answered Un/yeah or soune/that's right instead of "a little [earlier]" or "a little [later]".

Although the above embodiment describes an example wherein the present invention is applied to a stuffed doll toy, the present invention is by no means limited to stuffed dolls. Naturally it can be applied to other toys as well. Further, in addition to toys, the invention can be applied to game machines and electronic appliances that are used in everyday life. Thus, the invention has a broad range of application.

While the invention has been described in conjunction with several specific embodiments and applications, it is evident to those skilled in the art that many further alternatives, modifications and variations will be apparent in light of the foregoing description. This may include, in addition to stuffed animal toys, such applications and embodiments as gaming machines, home electronics, computer subsystems, electronic appliances or similar devices. Thus, the invention described herein is intended to embrace all such alternatives, modifications, applications and variations as may fall within the spirit and scope of the appended claims.

What is claimed is:

1. An interactive voice recognition apparatus, comprising:

a voice input unit to receive voice and translate the received voice into digital form;

a voice analysis unit in communication with said voice input unit to generate characteristic voice data for the received digitized voice;

a word detection unit in communication with said voice analysis unit to determine whether the characteristic voice data substantially matches standard characteristic voice information corresponding to pre-registered expressions and generates detected expression data in response thereto;

an affirmative/negative discrimination unit in communication with said voice analysis unit to characterize whether the characteristic voice data can be characterized as an affirmative or negative response and generates an affirmative/negative signal in response thereto;

a voice comprehension and conversation control unit in communication with said word detection unit and said affirmative/negative discrimination unit to:
  interrogate a recognition mode boolean;
  receive the detected data generated by said word detection unit, determine a contextual meaning based on the received detected data, and formulate an appropriate response if the recognition mode boolean is clear;
  receive the affirmative/negative signal generated by said affirmative/negative discrimination unit and formulate the appropriate response based on the received affirmative/negative signal and prior responses if the recognition mode boolean is set; and
  reset the recognition mode boolean based on the formulated appropriate response; and a voice synthesizer in communication with said voice comprehension and conversation control unit to generate synthesized audio corresponding to the appropriate response formulated by said voice comprehension and conversation control unit.

2. The voice recognition apparatus of claim 1, further comprising:
  a first memory in communication with said word detection unit to store standard characteristic voice information corresponding to the pre-registered expressions; and
  wherein said word detection unit:
    compares standard characteristic voice information associated with each pre-registered expression obtained from said first memory with the characteristic voice data generated by said voice analysis unit;
    generates detection data, comprising a numerical confidence match level, a starting detection time, and an ending detection time relative to the characteristic voice data, for each pre-registered expression; and
    transmits the generated detection data to said voice comprehension and conversation control unit.

3. The voice recognition apparatus of claim 2, wherein, for a preselected time period relative to the characteristic voice data, said voice comprehension and conversation control unit:
  identifies each pre-registered expression whose associated detection data match confidence level exceeds a predetermined minimum threshold as a potential recognition candidate; and
  selects an actual recognized candidate from the potential recognition candidate having the highest relative detection data match confidence level if more than one potential recognition candidate has been identified during the preselected time period.

4. The voice recognition apparatus of claim 2, further comprising:
  a second memory in communication with said voice comprehension and conversation control unit to store a correlation table; and
  wherein, for a preselected time period relative to the characteristic voice data, said voice comprehension and conversation control unit:
    identifies each pre-registered expression whose associated detection data match confidence level exceeds a predetermined minimum threshold as a potential recognition candidate; and
    if more than one potential recognition candidate has been identified during the preselected time period:
      compiles a correlation table based on a detection relationship between potential recognition candidates; and
      selects an actual recognition candidate based on the compiled correlation table.

5. The voice recognition apparatus of claim 2, further comprising:
  a second memory in communication with said voice comprehension and conversation control unit to store a plurality of expression context rules; and
  wherein said voice comprehension and conversation control unit:
    identifies each pre-registered expression whose associated detection data match confidence level exceeds a predetermined minimum threshold as a recognition candidate;
    if at least two recognition candidates have been identified, determines a relationship therebetween based on the expression context rules stored in said second memory; and
    formulates the appropriate response based on the determined relationship.

6. The voice recognition apparatus of claim 2, further comprising:
  a second memory in communication with said voice comprehension and conversation control unit to store a plurality of expression context rules; and
  wherein said voice comprehension and conversation control unit:
    identifies each pre-registered expression whose associated detection data match confidence level exceeds a predetermined minimum threshold as a recognition candidate;
    if at least two recognition candidates have been identified, determines whether a relationship therebetween exists based on the expression context rules stored in said second memory; and
    formulates an error message if no relationship has been determined.

7. The voice recognition apparatus of claim 1, wherein said affirmative/negative discrimination unit detects the first occurrence of a vowel component in the characteristic voice data generated by said voice analysis unit and generates the affirmative/negative signal according to the detected vowel component.

8. The voice recognition apparatus of claim 1, wherein said affirmative/negative discrimination unit detects the presence of negative language descriptors in the characteristic voice data generated by said voice analysis unit and generates the affirmative/negative signal if any negative language descriptors have been detected.

9. The voice recognition apparatus of claim 1, wherein
  said voice analysis unit generates a volume signal extracted from the digitized perceived voice; and
  said voice comprehension and conversation control unit selectively formulates the appropriate response responsive to the volume signal generated by said voice analysis unit.

10. The voice recognition apparatus of claim 1, wherein said voice comprehension and conversation control unit disables said voice input unit when said voice synthesis unit is generating synthesized audio.

11. The voice recognition apparatus of claim 1, wherein said voice comprehension and conversation control unit sets a dedicated recognition mode for subsequent word detection operations if, and only if, a first re-registered expression having a predefined contextual relationship with a second pre-registered expression is detected by said word detection unit.

12. The voice recognition apparatus of claim 1, further comprising:

a fluctuation data detection unit in communication with said voice comprehension and conversation control unit to measure and retain ambient fluctuation data including time, temperature, barometric pressure, date, and apparatus status information; and wherein said voice comprehension and conversation control unit receives the ambient fluctuation data from said fluctuation data detection unit and formulates the appropriate response based thereon.

13. An interactive voice recognition method, comprising the steps of:

perceiving voice;

translating the perceived voice into corresponding digital form;

generating characteristic voice data for the perceived digitized voice;

determining whether the characteristic voice data generated in said characteristic voice data generating step substantially matches standard characteristic voice information corresponding to pre-registered expressions;

generating detected expression data if it is determined in said determining step that the characteristic voice data generated in said characteristic voice data generating step substantially matches standard characteristic voice information corresponding to at least one of the pre-registered expressions;

characterizing whether the characteristic voice data generated in said characteristic voice data generating step constitutes either an affirmative or negative statement and generating a content characterization responsive thereto;

assimilating a contextual meaning based on the detected expression data generated in said detected expression data generating step;

based on a recognition mode, performing one of:
   formulating an appropriate response based on said assimilated contextual meaning assimilated in said assimilating step if the recognition mode is set for word recognition; and
   formulating the appropriate response based on the content characterization generated by said characterizing step if the recognition mode is set for affirmative/negative discrimination;

resetting the recognition mode based on the formulated appropriate response; and synthesizing audio corresponding to the appropriate formulated response.

14. The voice recognition method of claim 13, wherein said determining step comprises comparing standard characteristic voice information associated with each pre-registered expression with the characteristic voice data generated in said characteristic voice data generating step; and wherein said detected expression data generating steps comprises generating a numerical confidence match level, a starting detection time, and an ending detection time relative to the generated characteristic voice data for each pre-registered expression.

15. The voice recognition method of claim 14, wherein, for a preselected time period relative to the characteristic voice data, the steps of the method further comprise identifying each pre-registered expression whose associated detected expression data match confidence level exceeding a predetermined minimum threshold as a potential recognition candidate; and selecting an actual recognized candidate from the potential recognition candidate having the highest relative detection data match confidence level if more than one potential recognition candidate has been identified.

16. The voice recognition method of claim 14, wherein, for a preselected time period relative to the characteristic voice data, the steps of the method comprise:

identifying each pre-registered expression whose associated detected expression data match confidence level exceeds a predetermined minimum threshold as a potential recognition candidate; and if more than one potential recognition candidate has been identified:
   compiling a correlation table based on a detection relationship between potential recognition candidates; and
   selecting an actual recognition candidate based on the compiled correlation table.

17. The voice recognition method of claim 14, further comprising:

identifying each pre-registered expression whose associated detected expression data match confidence level exceeds a predetermined minimum threshold as a recognition candidate;

determining a relationship therebetween based on prestored expression context rules if at least two recognition candidates have been identified; and formulating the appropriate response based on the determined relationship, if any.

18. The voice recognition method of claim 14, further comprising:

identifying each pre-registered expression whose associated detected expression data match confidence level exceeds a predetermined minimum threshold as a recognition candidate;

determining whether a relationship therebetween exists based on prestored expression context rules if at least two recognition candidates have been identified; and formulating an error message if no relationship has been determined.

19. The voice recognition method of claim 13, wherein said characterizing step comprises scanning for the first occurrence of a vowel component in the characteristic voice data generated in said characteristic voice data generating step and generating the content characterization according to the first vowel component.

20. The voice recognition method of claim 13, wherein said characterizing step comprises scanning the characteristic voice data generated in said characteristic voice data generating step for the presence of negative language descriptors and indicating the content characterization as negative if any negative language descriptors have been detected.

21. The voice recognition method of claim 13, further comprising:

extracting a volume level of the perceived voice; and selectively formulating the appropriate response with respect to the extracted volume level.

22. The voice recognition method of claim 13, further comprising setting a dedicated recognition mode for subsequent word detection operations if, and only if, a first re-registered expression having a predefined contextual relationship with a second pre-registered expression is assimilated in said contextual meaning assimilating step.

23. The voice recognition method of claim 13, further comprising selectively augmenting the appropriate response with ambient fluctuation data including time, temperature, barometric pressure, date, and apparatus status information.

* * * * *